(No Model.)

J. M. LE FEVER.
FEED TROUGH.

No. 414,814. Patented Nov. 12, 1889.

Witnesses:

Inventor:

UNITED STATES PATENT OFFICE.

JACOB M. LE FEVER, OF STRANG, NEBRASKA.

FEED-TROUGH.

SPECIFICATION forming part of Letters Patent No. 414,814, dated November 12, 1889.

Application filed July 13, 1888. Serial No. 279,882. (No model.)

*To all whom it may concern:*

Be it known that I, JACOB M. LE FEVER, a citizen of the United States, residing at Strang, in the county of Fillmore and State of Nebraska, have invented a new and useful Trough-Cover, of which the following is a specification.

My invention relates to improvements in feed-trough covers, and has for its first object the production of a cheap and durable cover adapted to be used in connection with any oblong or rectangular box.

A further object is the provision of a cover which will be capable of easy application or removal from a trough, and which will permit the animal to feed at the trough without necessarily standing squarely in front of the feed-spaces and to move its head freely without liability of knocking or striking it.

To attain the desired objects, the invention consists of the trough-cover constructed as herein illustrated, described, and specifically claimed.

Figure 1:
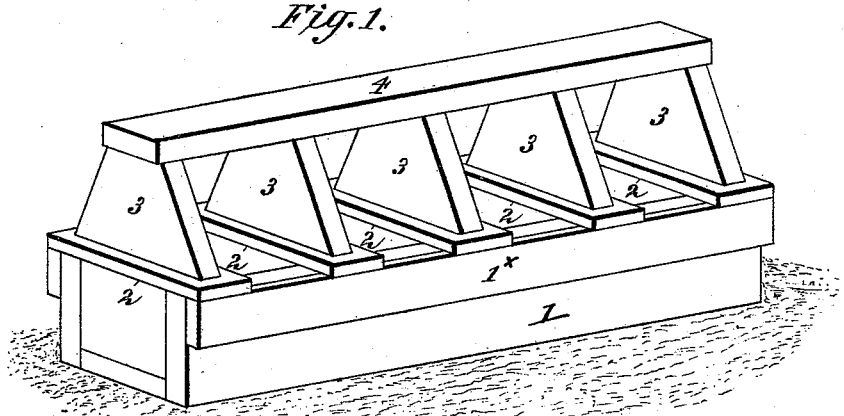
Figure 2:
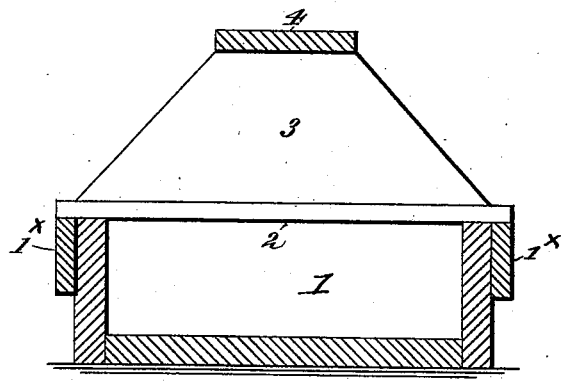

In the drawings, Figure 1 is a perspective view of a cover embodying my invention. Fig. 2 is a vertical transverse section thereof.

Referring by numerals to the drawings, the numeral 1 designates a suitable feed trough or box of rectangular shape.

$1^x$ designates the depending longitudinal retaining-flanges of my improved cover, which are adapted to embrace or fit on the sides of the box.

2 designates cross-pieces connecting the retaining-flanges. These cross-pieces are arranged parallel with each other, are quite broad, and such a distance apart as to admit only the nose or lower part of the head of an animal, in order to prevent the animal from lying in the trough.

3 designates uprights rising from the broad pieces 2, from the center thereof, and said uprights are tapering upward, and on the apices of the tapering uprights is supported the longitudinal bar 4. The tapering uprights are held in position solely by the said bar and the said cross-pieces. Between the uprights 3 is sufficient space to admit the head of an animal, and the tapering of the standards renders the feed-spaces free and unobstructed from side to side of the trough, and thereby allows the animal to readily insert and withdraw his head without danger of striking or knocking it.

It will be seen from the foregoing that my cover possesses many advantages, notably among which is the fact that the cover can be applied to any ordinary feed-box and removed therefrom at will for any purpose.

In a feed-trough made in accordance with my invention the parts are so constructed and arranged as to form the feed-spaces unobstructed from side to side of the trough. By this arrangement the animal is permitted to feed without any danger of striking or knocking its head against the top or sides of the trough.

What I claim is—

The herein-described cover for a feed-trough, consisting of the solid cross-pieces, the longitudinal bar, the tapered uprights rising from the cross-pieces and held in position solely by the bar and the cross-pieces, whereby feeding-spaces are formed which are unobstructed from side to side of the trough, and the depending longitudinal retaining-flanges secured to the cross-pieces for holding the cover in position on the trough, as set forth.

JACOB M. LE FEVER.

Witnesses:
THOMAS B. MILLER,
T. W. JEWELL.